United States Patent [19]

Brycki

[11] Patent Number: 4,718,169

[45] Date of Patent: Jan. 12, 1988

[54] CONTACT ASSEMBLY FOR DISTANCE MEASURING GAUGE

[75] Inventor: Bogdan Brycki, Maple Shade, N.J.

[73] Assignee: RCA Corporation, Princeton, N.J.

[21] Appl. No.: 941,367

[22] Filed: Dec. 15, 1986

[51] Int. Cl.$^4$ .................................................. G01B 5/00
[52] U.S. Cl. .................................................. 33/143 R
[58] Field of Search ............... 33/167, 549, 143 R,
33/143 M, 143 J, 143 K, 147 R, 158, 159,
530–538, 553, 554

[56] References Cited

U.S. PATENT DOCUMENTS

| | | |
|---|---|---|
| 635,088 | 10/1899 | Bowker . |
| 997,989 | 7/1911 | Glickert .......................... 33/167 X |
| 1,411,911 | 4/1922 | Desbains . |
| 2,524,256 | 10/1950 | Greany . |
| 2,814,882 | 12/1957 | Tillman ............................ 33/167 X |
| 2,831,260 | 4/1958 | Shaw ................................. 33/167 X |
| 4,107,849 | 8/1978 | Lettau . |

FOREIGN PATENT DOCUMENTS 954815 6/1949 France ........................... 33/143 M

OTHER PUBLICATIONS

Metalworking Production: p. 1748, 10/26/56.

Primary Examiner—Harry N. Haroian
Attorney, Agent, or Firm—Allen L. Limberg; William Squire

[57] ABSTRACT

A first measuring contact is displaced along a gauge distance measuring axis to measure the distance to a second reference contact. Both contacts pivot about axes that lie on the gauge measuring axis and on the respective contact surfaces. When the contacts abut, the pivot axes are coextensive. Both contacts can engage a contoured wall regardless its angle to the gauge measuring axis and accurately measure the wall thickness along the gauge measuring axis.

7 Claims, 6 Drawing Figures

CONTACT ASSEMBLY FOR DISTANCE MEASURING GAUGE

This invention relates to contacts for a distance measuring gauge.

Distance measuring gauges are in wide use and may comprise, for example, distance indicators of the type illustrated in U.S. Pat. No. 4,107,849. In this patent, a dial indicator is secured to a support at a reference position. A movable stem is attached to the indicator which displaces in a linear direction along the stem axis. The linear displacement of the stem is measured by the dial indicator. The extended tip of the stem terminates in an arcuate member. The stem tip may be secured fixed to the stem or may be pivoted to the stem as illustrated in the calipers of U.S. Pat. No. 635,088.

The stem tips are hereinafter referred to as "gauge contacts" and are elements which make physical contact with the surface whose distance is being measured from a reference point. The problem with the gauge contacts of these prior art systems is that while the stem may displace along a given axis, an assumption is made that the contact physically engages the workpiece surface along that axis.

The present invention recognizes that that assumption is not valid for surfaces which taper or are otherwise inclined relative to the displacement axis of the gauge stem. A need is seen, therefore, for a contact assembly for a distance measuring gauge which will accurately measure the position of a point on a surface which inclines relative to the indicator stem displacement axis relative to a reference point.

More particularly, according to the present invention, in a distance measuring gauge which includes an indicating device secured to a body a contact assembly includes a member adapted to be linearly movably coupled to the device along a first axis. The device indicates the magnitude of the relative linear displacement of the member to the body along that axis. A measuring contact is rotatably secured to the member for rotation about a second axis lying on the first axis. The contact has a measuring surface adapted to abut the surface of a workpiece, the measuring surface lying on the second axis and intersecting the first axis. Because the contact rotates about the second axis which lies on the measuring first axis, the indicating device accurately measures the distance from a point on the workpiece surface defined by the intersection of the two axes to a reference point to provide a true measurement of the relative distance between the workpiece surface and the reference point.

Figure 1:
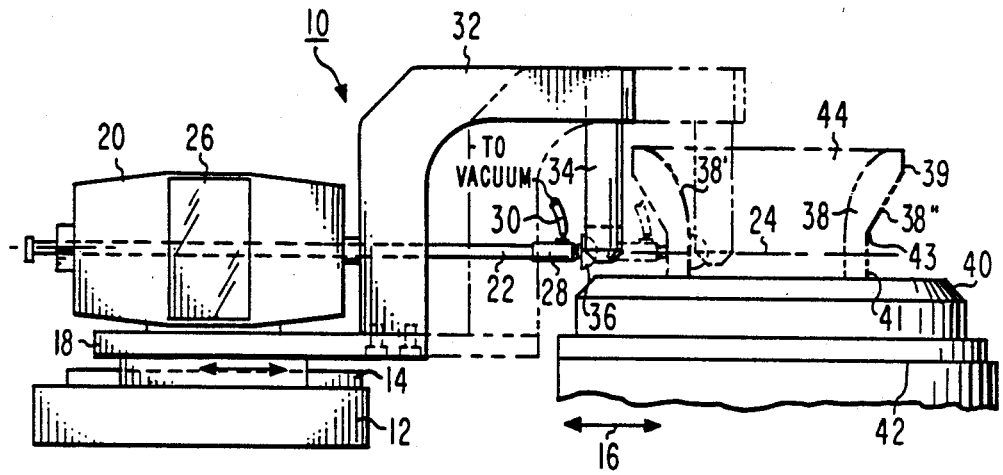
FIG. 1 is a side elevation view of a distance measuring gauge in accordance with one embodiment of the present invention.

In FIG. 1, distance measuring gauge 10 comprises a base 12 adapted for mounting on a table or other support. A set of ways 14 are secured on base 12 and extend in axial directions 16. A support member 18 mates with the ways 14 for slidable displacement in directions 16. A drive system (not shown) moves the support member 18 in directions 16. A linear indicating distance measuring device 20 is secured to support member 18. Movably secured to device 20 and its indicating mechanism is a circular cylindrical stem 22 which displaces in directions 16 on axis 24.

The device 20 is commercially available and its details need not be included herein. Device 20 includes a calibration mechanism in which a position of the stem 22 may be set to a reference value, for example, zero.

Secured to the extended end of stem 22 is a contact assembly 28. Assembly 28 is coupled to a vacuum source, i.e., a vacuum pump, via hose 30. An L-shaped arm 32 is screwed to support member 18. A circular cylindrical leg 34 depends from arm 32. A second contact assembly 36 is secured to the lower end of leg 34 aligned on axis 24. By way of example, the position of stem 22, FIG. 1, with the contact assemblies 28 and 36 abutting may be a reference position with the display 26 indicating zero.

In the reference position of FIG. 1, leg 34 and contact assembly 36 provide a reference point to which device 20 is calibrated. In the present embodiment, the two contact assemblies 28 and 38 are used to provide a thickness measurement such as a wall thickness of a television tube yoke core 38 shown in phantom. The core 38 is a somewhat conical structure of different wall thicknesses. The internal wall surface 38' is convex. The external wall surface 38" comprises a set of different surfaces of revolution. Surfaces 39 and 41 are right circular cylinders. Surface 43 is a right circular conical frustrum. Thus, surfaces 39 and 41 are concentric cylinders which are perpendicular to axis 24. Surface 43 tapers at an angle less than 90° to axis 24. The wall thickness of the core 38 is important and the accuracy of the wall thickness measurement is needed for certain test measurements made on the core 38 which measurements are not part of the present invention. The core 38 is clamped to a base 40 mounted on a fixed support 42.

In measuring the wall thickness of core 38, the leg 34 is disposed within the central region 44 of core 38 as shown in phantom. Contact assembly 36 abuts the inner surface 38' of the core 38 and the contact assembly 28 abuts the exterior surfaces 39, 41 and, 43. Since the contact assembly 36 represents a reference point, the displacement of the contact assembly 28 relative to assembly 36 as indicated by display 26 provides a thickness measurement for the wall of core 38 throughout regardless of the tapering or angles of the wall at surfaces 38' and 43 relative to axis 24 as will be explained more fully below.

Figure 2:
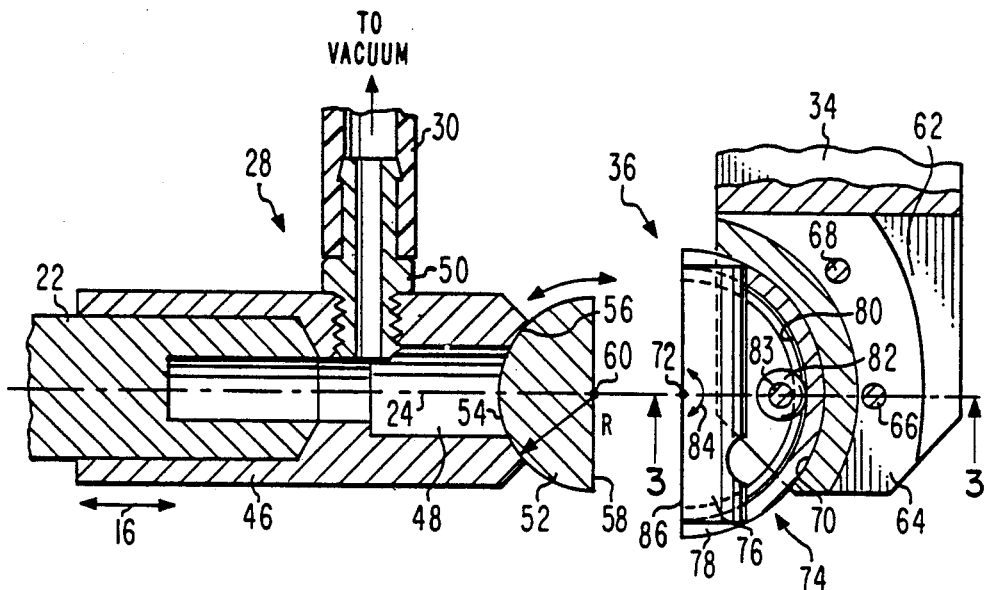
FIG. 2 is an enlarged sectional elevational view of the measuring contacts of the distance measuring gauge of FIG. 1.

In FIG. 2, contact assembly 28 comprises a hollow coupler 46 press fitted onto the end of stem 22. Coupler 46 is a circular cylindrical metal tubular-like element whose hollow core forms a chamber 48. A nipple 50 is threaded to coupler 46 in communication with chamber 48. The vacuum hose 30 is connected to nipple 50. During operation, the chamber 48 is evacuated.

Contact assembly 28 has a semispherical contact 52 which may be made of stainless steel. Contact 52 has a spherical surface 54 which is seated in coupler 46 mating spherical surface 56 adjacent chamber 48. Contact 52 is held in place by the pressure differential between ambient atmosphere and the low pressure of evacuated chamber 48. Contact 52 has a planar contact surface 58 which is on the diameter of the sphere of which surface 56 is part. Contact 52 has a radius R emanating from axis 60 of the sphere defined by surface 54. Axis 60 is a point about which contact 52 is rotatable in all directions even in the presence of the pressure differential, the seating of the contact on surface 56 being somewhat bearing-like. Surface 58 intersects axis 24 and since this surface rotates about axis 60 on axis 24, axis 60 does not displace relative to axis 24 during a measuring step which may rotate contact 52. Regardless the angle or contour a work surface may have when it abuts contact 52, axis 60 at surface 58, which represents the measuring point, represents the accurate position of stem 22 during measurement. Thus, the position of stem 22, when contact 52 abuts the workpiece surface regardless the angle or contour of that workpiece surface relative to axis 24, is the true and accurate position of that workpiece surface along axis 24.

Figure 3:
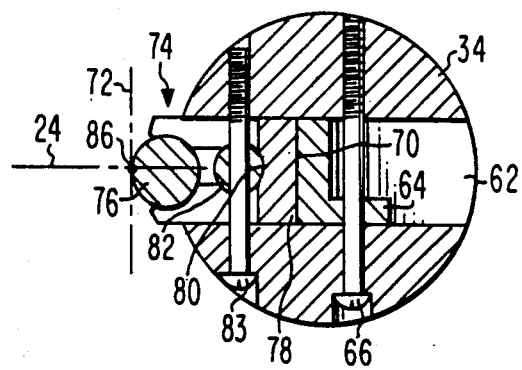
FIG. 3 is a sectional plan view through one of the contacts of the gauge of FIG. 2 taken along lines 3—3.

In contact assembly 36, FIGS. 2 and 3, leg 34 is bifurcated by slot 62 at the leg 34 lower extended end. An arcuate rail 64 is secured in slot 62 to leg 34 by screws 66 and 68. Rail 64 has a circular cylindrical concave rail surface 70. Axis 72 is the center of the circular cylinder defined by surface 70. Axis 72 is perpendicular to and intersects axis 24. Axis 72 is normal to the plane of the drawing. Assembly 36 has a contact 74 which is rotatably secured to leg 34. Contact 74 comprises a circular cylindrical pin 76 whose ends are secured to a semicircular cylindrical rail 78. The pin 76 longitudinal axis is normal to axis 24. The outer convex circular cylindrical surface of rail 78 abuts and slides against the concave surface 70 of rail 64 about axis 72. Rail 78 includes a circular groove 80 whose center is axis 72 and extends for the length of rail 78 to where it abuts pin 76. Spherical wheel 82 is rotatably secured to leg 34 in slot 62 by screw 83 and rides within groove 80 as a bearing. Wheel 82 captures rail 78 against the circular concave surface of rail 64.

Figure 4:
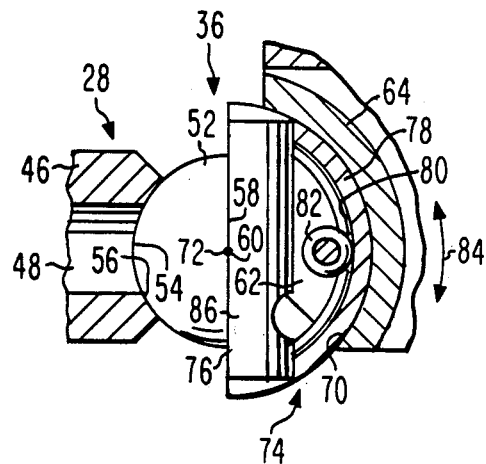
FIG. 4 is a side elevation sectional view similar to the view of FIG. 2 with the contacts abutting similar to the arrangement of FIG. 1.

Thus, contact 74 is free to rotate about axis 72 in angular directions 84 in response to engagement of pin 76 with a workpiece surface which may taper relative to axis 24. Tangential surface 86 of pin 76 passes through axis 72 normal to axis 24 parallel to the longitudinal axis of pin 76. Surface 86 provides line contact when it abuts surface 58 of contact 52. While contact 52 can rotate about axis 60 in any direction, contact 74 can only rotate about axis 72 in directions 84. When contacts 52 and 74 abut, axes 60 and 72 are coextensive and superimposed. At that point, contacts 52 and 74 can rotate about the same axis which lies on axis 24 of stem 22. This latter arrangement is shown in FIG. 4. That coincidence of axes 60 and 72 provides a reference point for calibrating the zero position of the indication on the display of indicating device 20.

Figure 5A:
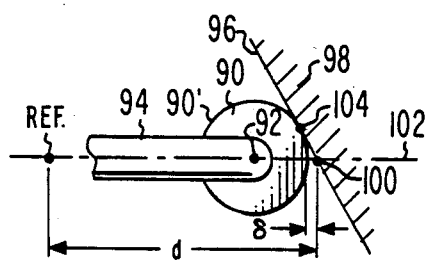
FIGS. 5a and 5b are diagrammatic illustrations useful for explaining the principles of the present invention.

In FIG. 5a, a prior art curved contact 90 pivots about axis 92. The workpiece engagement surface 90' of contact 90 is spaced from axis 92. Contact 90 is pivoted to stem 94 of a distance indicating device (not shown). Assuming the contact 90 is a ball, wheel, or similar curved element, the contact 90 contact surface at point 100 is aligned on measuring axis 102. However, point 104 of contact 90 which is spaced from point 100 engages surface 96 of a tapered workpiece. Surface 96 is at an angle less than 90° to axis 102 of stem 94. The contact point 104 is spaced from axis 102 and thus introduces an error δ in the distance measurement of surface 96 along axis 102. δ represents the difference in distance along axis 102 between the location of surface 96 where it intersects axis 102 from the point along axis 102 where contact 90 actually engages the workpiece 98 surface 96. The displacement measurement error δ can be significant in the measurement of certain devices such as core 38, FIG. 1.

Figure 5B:
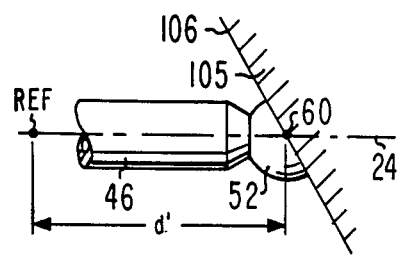

Employing the contact assembly of the present invention as shown in FIG. 5b, the contact 52 rotates about axis 60 regardless of the angle of the workpiece 105 surface 106 to axis 24. Therefore, the displacement of coupler 46 (and stem 22) along axis 24 is a true displacement of the workpiece 105 surface 106 relative to axis 24 and, therefore, provides an accurate relative measurement of the location of surface 106 where it intersects axis 24 from a reference point on axis 24.

The contact assembly 36 axis 72, FIG. 2, provides a reference point where it intersects axis 24. That reference point does not shift position as might occur if the contact rotated about a point spaced from axis 24, as discussed above. Thus, the measuring contact 52 and reference contact assembly 76 measuring points always remain on axis 24 at the point of engagement with the workpiece surface regardless the workpiece surface angle to axis 24.

While the structure of contact 52 and assembly 76 illustrate spherical and cylindrical contacts, respectively, these are given by way of example, and not by way of limitation. Other contact shapes may be employed in their place in accordance with a given implementation. The important point is that both contacts, or one contact where only one contact is used, as on stem 22 alone, rotate about a point that is coextensive with the contact workpiece engagement surface.

In the case of a single contact implementation, there occurs arrangements wherein the position of the device 20 serves as a reference point and the displacement of the contact on stem 22 provides a relative distance measurement. The engagement of contact 52 with a workpiece surface that tapers relative to axis 24 provides an accurate distance measurement to the reference point represented by the device 20 position.

It should also be appreciated that contacts 52 and 74 have straight surfaces which are employed to measure straight or convex surfaces. With respect to concave surfaces a pointed conical or small spherical contact (not shown) is substituted for one of the movable contacts and rigidly connected either to stem 22 or leg 34. The tip of the pointed contact lies on axis 24. The other contact 52 or 74, as the implementation warrants, abuts a straight or convex surface.

What is claimed is:

1. A distance measuring gauge for indicating the value of the distance between a point on a workpiece surface and a reference point comprising:

a distance indicating device including a body representing said reference point;

a distance measuring member coupled to the device and adapted to displace a distance to be measured from said reference point along a first axis, said device including means responsive to the displacement of the member for indicating the distance displacement value of the member;

a measuring contact rotatably secured to the memeber and having a measuring surface adapted to abut the workpiece surface, said contact being secured for rotation about a second axis intersecting the first axis, said second axis lying on said measuring surface;

said gauge including an arm secured to the body, a second measuring contact including a circular cylinder rotatably secured to the arm for rotation about a third axis intersecting said first axis, said second contact having a linear reference measuring surface, said third axis lying on said reference measuring surface, said third axis being tangent to the surface of said cylinder.

2. The gauge of claim 1 wherein said contact has a linear contact surface.

3. The gauge of claim 1 wherein said contact comprises an element having a spherical surface and a planar diametrical surface, said member having a spherical contact receiving surface for receiving said element spherical surface, the center of said spherical surfaces lying on said planer diametrical surface.

4. The gauge of claim 3 wherein said member includes a chamber in communication with said element spherical surface and means for coupling said chamber to a vacuum source.

5. A distance measuring gauge comprising:
- an indicating device including a measuring member and a body for indicating the magnitude of linear displacement of the member relative to the body, said member adapted for displacement along a first axis;
- said member having an end adapted to rotatably receive a first measuring contact for rotation about a second axis lying on the first axis;
- means for rotatably securing said first measuring contact to said end about said second axis, said contact having a measuring surface lying on said second axis and intersecting the first axis;
- an arm fixed relative to the body; and
- a second measuring contact rotatably secured to the arm for rotation about a third axis, said second contact having a measuring surface lying on said third axis which intersects said first axis;
- said second measuring contact including a right circular cylindrical member having an outer surface and a mounting member secured to the cylindrical member, said cylindrical member having a longitudinal axis intersecting said first axis, said third axis being tangential to said cylindrical member outer surface, and pivot means for pivotally securing said mounting member to said arm.

6. The gauge of claim 5 wherein said means for rotatably securing the first measuring contact to said member includes means for creating a vacuum between said member and said first measuring contact.

7. The gauge of claim 5 wherein said first contact is a semispherical member having a planar diametrical measuring contact surface and a spherical mounting surface, said member having a sperical surface adapted to mate with and receive said spherical mounting surface.

* * * * *